2,727,877

THERMOSET SULFONAMIDE POLYMERS

Harold F. Park, East Longmeadow, Mass., assignor to Monsanto Chemical Company, St. Louis, Mo., a corporation of Delaware No Drawing. Application January 26, 1953, Serial No. 333,346

7 Claims. (Cl. 260—45.2)

This invention relates to polymers and copolymers of vinyl sulfonamide. More particularly, the invention relates to a process for improving the solvent resistance of polymers and copolymers of vinyl sulfonamide and to the solvent resistance products.

The polymers and copolymers of vinyl sulfonamide are thermoplastic resins which are soluble in and swollen by many organic solvents and by water if the vinyl sulfonamide content is high enough.

One object of this invention is to provide solvent resistant polymers and copolymers of vinyl sulfonamide.

Another object is to provide thermosetting and thermoset polymers and copolymers of vinyl sulfonamide.

A further object is to provide a process for increasing the solvent resistance of and to thermoset polymers and copolymers of vinyl sulfonamide.

These and other objects are attained by reacting a polymer or copolymer of vinyl sulfonamide with a methylol derivative of an amino compound.

The following examples are given in illustration and are not intended as limitations on the scope of this invention. Where parts are mentioned, they are parts by weight.

Example I

Mix together 100 parts of pulverulent homopolymer of vinyl sulfonamide and 100 parts of pulverulent hexamethylol melamine until a thorough commingling of the dry materials is obtained. Mold the powder by compression molding methods at about 325° F. and 100 p. s. i. g. into a disc. The disc is hard, non-brittle and thermoset. It is more resistant to acids and alkalies than either the polyvinyl sulfonamide or the melamine resin.

Example II

Dissolve 100 parts of polyvinyl sulfonamide and 0.8 part of monomeric trimethylol melamine in 400 parts of water to form a viscous solution. Force this solution through a six-denier spinneret into a coagulating bath of acetone, dry the filament thus formed and then heat the filament to about 200° F. The product is an insoluble, infusible tough filament which may be spun into yarns and then woven into textiles having exceptional resistance to organic and inorganic solvents including acids and alkalies.

Example III

Mix together 100 parts of pulverulent homopolymer of vinyl sulfonamide and 30 parts of dimethylol urea until a homogeneous mixture is obtained. Mold this mixture into a cup, dish, tray or other desired article at about 150° C. and 50 p. s. i. g. A clear substantially colorless thermoset article is obtained which is resistant to hot and cold water and to acids and alkalies.

Example IV

Mix 100 parts of a copolymer of 5 parts of vinyl sulfonamide and 100 parts of styrene with 2 parts of trimethylol melamine. Injection mold the mixture under standard conditions for molding styrene homopolymers. The articles produced are thermoset, have a high heat distortion temperature and are substantially insoluble in organic and inorganic media.

Example V

Dissolve 100 parts of a copolymer of 100 parts of vinyl sulfonamide and 85 parts of vinyl acetate and 5 parts of dimethylol dicyandiamide in 200 parts of hot water. The solution has a relatively high viscosity but is easily spread on various surfaces by a doctor knife, spatula or other conventional means. Apply a thin coat of the viscous solution to one surface of each of two pieces of hard wood. Place the coated surfaces together and apply heat and pressure to the assembly. At 50° C. and 10 p. s. i. g. pressure, a strong laminate is obtained in which the bond is substantially impervious to moisture and is not softened by heat alone.

The polymers of this invention are polymers and copolymers of vinyl sulfonamide. Vinyl sulfonamide has the following formula $$CH_2=\overset{H}{\underset{}{C}}-SO_2NH_2$$

It may be prepared by dehydration of the ammonium salt of vinyl sulfonic acid. The homopolymers of vinyl sulfonamide are water-soluble. When used as a co-monomer with other vinylidene compounds, it imparts water-sensitivity thereto.

The vinyl sulfonamide may be copolymerized with a great majority of vinylidene compounds by the well known methods of addition polymerization. Among the vinylidene compounds polymerizable with vinyl sulfonamide are vinylidene halides, vinyl halides, vinyl esters, vinyl ethers, acrylic acids, acrylic esters, acrylonitriles, acrylamides, vinyl aromatic hydrocarbons, aliphatic olefins and diolefins, etc. The vinyl sulfonamide may constitute 1–99% by weight of the copolymer.

The polymers and copolymers of vinyl sulfonamide are rendered substantially insoluble in water and organic solvents and are thermoset by the reaction thereof with methylol derivatives of amino compounds including methylol derivatives of urea, dicyandiamide, cyanamide, melamine and other aminotriazines reactable with formaldehyde, guanidine and guanidine derivatives. The amino compounds must contain at least one hydrogen atom connected to a nitrogen atom. The methylol derivatives of the amino compounds are formed by reaction thereof with formaldehyde under conditions preventing substantial polymerization of the methylol compounds. The methylol derivatives and methods for preparing them are well-known in the art.

The amount of methylol derivative used should be based on the methylol radicals in the compound. A convenient terminology for describing this unit is methylol equivalent. As an example, one gram molecular weight of hexamethylol melamine contains 6 methylol equivalents and one methylol equivalent would be ⅙ of the gram molecular weight. On this basis the amount of methylol derivative may be varied from 0.01 to 2 methylol equivalents per mol of vinyl sulfonamide.

No catalyst is necessary when the reaction between the sulfonamide polymer and the methylol derivative is carried out at temperatures substantially above 25° C. To form a cold setting adhesive it may be advantageous to use a small amount of a condensation catalyst which may be an acid or an alkali depending on the nature of the methylol derivative.

The products of this invention are substantially insoluble in water and organic solvents even though both the polyvinyl sulfonamide and the methylol derivative are separately soluble in or sensitive to water. When vinyl sulfonamide homopolymer is used the amount of methylol derivative necessary to obtain water insolubility may be as low as 0.01 methylol equivalent per mol of sulfonamide and to obtain an infusible thermoset product about 0.1 methylol equivalent is sufficient.

In copolymers containing only small amounts of the vinyl sulfonamide a higher mol ratio of methylol derivative must be used to obtain insolubilization. As a general rule, at least one vinyl sulfonamide in the polymeric chain must be reacted with a methylol derivative to obtain the desired benefits.

Conventional additives such as plasticizers, lubricants, fillers, dyes, pigments, stabilizers, etc. may be added to the compositions of this invention, preferably before the reaction with the methylol derivative.

It is obvious that variations may be made in the products and processes of this invention without departing from the spirit and scope thereof as defined in the appended claims.

What is claimed is:

1. A substantially insoluble reaction product of a polymer of vinyl sulfonamide and a methylol derivative of an organic compound containing an amino group reactable with formaldehyde to form the said methylol derivative.

2. A product as in claim 1 wherein the organic compound is melamine.

3. A product as in claim 1 wherein the organic compound is urea.

4. A product as in claim 1 wherein the organic compound is dicyandiamide.

5. A product as in claim 1 wherein the polymer is a copolymer of vinyl sulfonamide and another vinylidene compound taken from the group consisting of vinyl aromatic hydrocarbons and vinyl esters.

6. A product as in claim 5 wherein the vinylidene compound is styrene.

7. A product as in claim 5 wherein the vinylidene compound is vinyl acetate.

References Cited in the file of this patent

UNITED STATES PATENTS

| | | |
|---|---|---|
| 2,491,102 | Frowde | Dec. 13, 1949 |
| 2,515,714 | Jones et al. | July 18, 1950 |
| 2,615,000 | Bradley | Oct. 21, 1952 |

FOREIGN PATENTS

| | | |
|---|---|---|
| 676,376 | Great Britain | July 23, 1952 |